US010250705B2

(12) United States Patent
Asvaraksh et al.

(10) Patent No.: US 10,250,705 B2
(45) Date of Patent: Apr. 2, 2019

(54) INTERACTION TRAJECTORY RETRIEVAL

(71) Applicant: International Business Machines Corporation, Armonk, NY (US)

(72) Inventors: Visarut Asvaraksh, Bangkok (TH); Henry Co, Oakleigh (AU); Changrui Ren, Beijing (CN); Kyungsoon Um, Seoul (KR); Li Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 14/835,933

(22) Filed: Aug. 26, 2015

(65) Prior Publication Data

US 2017/0064019 A1 Mar. 2, 2017

(51) Int. Cl.
*H04L 29/08* (2006.01)
*H04L 12/24* (2006.01)

(52) U.S. Cl.
CPC .......... *H04L 67/22* (2013.01); *H04L 41/5074* (2013.01); *H04L 67/02* (2013.01); *H04L 67/16* (2013.01)

(58) Field of Classification Search
CPC .................................................. H04L 41/5074
See application file for complete search history.

(56) References Cited

U.S. PATENT DOCUMENTS

| 7,870,491 B1 | 1/2011 | Henderson et al. |
| 8,060,789 B2 | 11/2011 | Eickmeyer et al. |
| 9,626,159 B2 * | 4/2017 | Mahmud ............. G06F 11/3414 |
| 2006/0074883 A1 * | 4/2006 | Teevan ............... G06F 17/30867 |
| 2007/0282765 A1 * | 12/2007 | Visel ........................ G06N 3/02 |
| | | 706/14 |
| 2010/0287572 A1 | 11/2010 | Lee |
| 2013/0030908 A1 | 1/2013 | Gessner et al. |
| 2013/0080420 A1 | 3/2013 | Taylor et al. |
| 2014/0298093 A1 | 10/2014 | Cook et al. |

(Continued)

FOREIGN PATENT DOCUMENTS

CN    103488507 A    1/2014

OTHER PUBLICATIONS

Kantner, L. "Following a Fast-Moving Target: Recording User Behavior in Web Usability Testing". Reprint of an article appearing in the Usability Professionals' Association's publication Common Ground, vol. 8, No. 2, May 1998, pp. 1-8. <http://teced.com/wp-content/uploads/2011/06/commonlk98Following-fast-moving-target.pdf>.

(Continued)

*Primary Examiner* — Vivek Srivastava
*Assistant Examiner* — Todd L Barker
(74) *Attorney, Agent, or Firm* — Anthony R. Curro (57) ABSTRACT

Embodiments of the present invention may track a user's interaction trajectory associated with a problem occurred on a website. According to one embodiment of the present invention, an interaction history of interactions between a user and a website may be obtained. An action description associated with actions performed by a user on a website is received. Then, at least one interaction matching the action description is retrieved from an interaction history of interactions between the user and the website. Further, an interaction trajectory may be generated based on the retrieved at least one interaction.

9 Claims, 5 Drawing Sheets

(56) References Cited

U.S. PATENT DOCUMENTS

| | | | |
|---|---|---|---|
| 2015/0356568 A1* | 12/2015 | Milstein | G06Q 30/01 |
| | | | 705/304 |
| 2016/0048778 A1* | 2/2016 | Sharon | G06Q 10/063 |
| | | | 705/7.11 |
| 2017/0017886 A1* | 1/2017 | Gao | G06N 5/04 |

OTHER PUBLICATIONS

Kravitz, A. "Coremetrics vs. Omniture vs. Google Analytics". Aug. 12, 2012. Updated: Feb. 26, 2013, pp. 1-37. <http://webcache.googleusercontent.com/search?q=cache:QofO_1P1eTsJ:www.akravitz.com/coremetrics-vs-omniture-vs-google-analytics/+&cd=1&hl=en&ct=clnk&gl=us>.

Chrome Browser. "Get a fast, free web browser". One browser for your computer, phone and tablet. For Windows 8.1/8/7/Vista/XP 32-bit. [online] [printed: Jul. 17, 2015]. pp. 1-4. <https://www.google.com/chrome/browser/desktop>.

IBM. "IBM Now Factory—Overview". Transform telecommunications network data into usable insight into real time actionable insight. [online][Printed: Jul. 17, 2015]. pp. 1-2. <http:/www-01.ibm.com/software/data/now-factory>.

IBM. "IBM Tealeaf is now part of IBM—Overview". [online][Printed: Jul. 17, 2015]. 1 page. <http:/www-01.ibm.com/software/info/tealeaf>.

\* cited by examiner

310 — RECEIVE AN ACTION DESCRIPTION ASSOCIATED WITH ACTIONS PERFORMED BY A USER ON A WEBSITE

320 — RETRIEVE AT LEAST ONE INTERACTION MATCHING THE ACTION DESCRIPTION FROM AN INTERACTION HISTORY OF INTERACTIONS BETWEEN THE USER AND THE WEBSITE

330 — GENERATE AN INTERACTION TRAJECTORY BASED ON THE RETRIEVED AT LEAST ONE INTERACTION.

INTERACTION TRAJECTORY RETRIEVAL

BACKGROUND

The present invention relates generally to information retrieval, and more particularly, to user interaction trajectory retrieval.

With developments of computer and network technologies, online services can now provide great support in every aspect of people's life. For example, more and more service providers in many industries begin to provide online services and users can access these services via a network instead of visiting the service provider's offices personally.

In order to meet increasing requirements from the user, websites offering online services grow more and more complicated, and the user may be faced with many webpages displayed in the browser. In order to achieve a goal, a user has to connect to a website, input account information, and interact with the website. Some potential technical problems such as system crash or unknown errors may occur in the web site system. When these problems occur, the user usually calls the provider's service center, describes the problems to the service staff, and asks for help. As contents displayed in the user's browser are invisible to the service staff, the service staff can only collect information about the problem from the user's description. However, it is hard for the service staff to clearly understand the user's previous interactions with the website, thereby inefficiency is caused in troubleshooting.

Although some solutions have been proposed to record the user's interaction history on the website, the interaction history is recorded at the user's computer and is unknown to the service staff. In addition, the interaction history usually relates to hundreds of or more interactions, even if this history is transmitted to the service staff, it is impossible to quickly find out corresponding interactions described by the user during the call.

SUMMARY

In one aspect, a computer-implemented method is proposed. According to the method, an action description associated with actions performed by a user on a website is received. Then, at least one interaction matching the action description is retrieved from an interaction history of interactions between the user and the website. Next, an interaction trajectory is generated based on the retrieved at least one interaction.

In another aspect, a computing system is proposed. The computing system comprises a computer processor coupled to a computer-readable memory unit, the memory unit comprising instructions that when executed by the computer processor implements a method. In the method, an action description associated with actions performed by a user on a website is received. Then, at least one interaction matching the action description is retrieved from an interaction history of interactions between the user and the website. Next, an interaction trajectory is generated based on the retrieved at least one interaction.

In yet another embodiment, a computer program product is proposed. The computer program product is tangibly stored on a non-transient machine readable medium and comprising executable instructions which, when executed on an electronic device, cause the electronic device to receive an action description associated with actions performed by a user on a website; retrieve at least one interaction matching the action description from an interaction history of interactions between the user and the website; and generate an interaction trajectory based on the retrieved at least one interaction.

It is to be understood that the Summary is not intended to identify key or essential features of embodiments of the present invention, nor is it intended to be used to limit the scope of the present invention. Other features of the present invention will become easily comprehensible through the description below.

BRIEF DESCRIPTION OF THE DRAWINGS

Through the more detailed description of some embodiments of the present disclosure in the accompanying drawings, the above and other objects, features, and advantages of the present disclosure will become more apparent, wherein.

Throughout the drawings, same or similar reference numerals represent the same or similar elements.

DETAILED DESCRIPTION

The principle of the present invention will now be described with reference to some example embodiments. It is to be understood that these embodiments are described only for the purpose of illustration and help those skilled in the art to understand and implement the present invention, without suggesting any limitations as to the scope of the invention. The invention described herein can be implemented in various manners other than the ones describe below.

As used herein, the term "includes" and its variants are to be read as opened terms that mean "includes, but is not limited to." The term "based on" is to be read as "based, at least in part, on." The term "one embodiment" and "an embodiment" are to be read as "at least one embodiment." The term "another embodiment" is to be read as "at least one other embodiment." Other definitions, explicit and implicit, may be included below.

Figure 1:
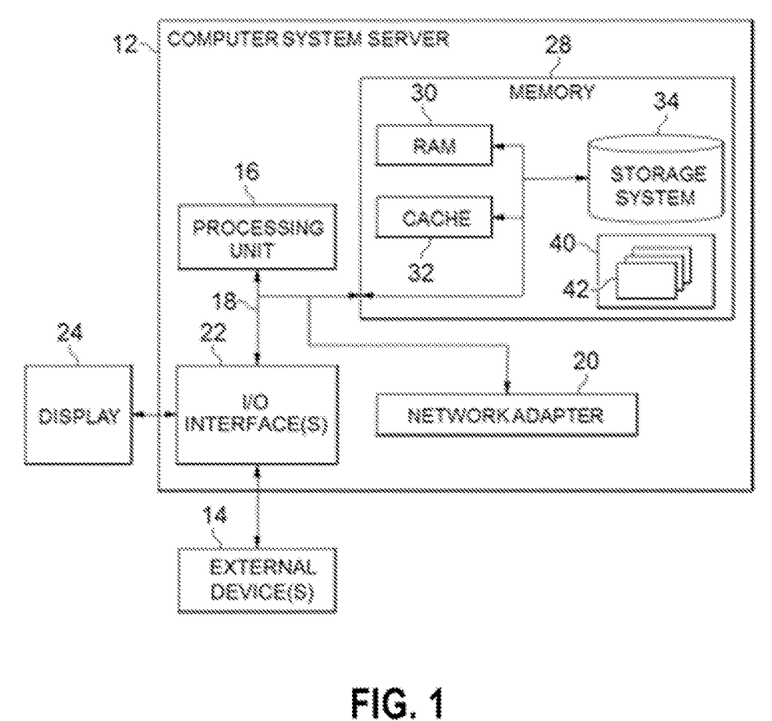
FIG. 1 schematically illustrates an example computer system server, which is applicable to implement embodiments of the present invention.

Reference is first made to FIG. 1, in which an example electronic device or computer system server 12 which is applicable to implement the embodiments of the present invention is shown. Computer system server 12 is only illustrative and is not intended to suggest any limitation as to the scope of use or functionality of embodiments of the invention described herein.

As shown in FIG. 1, computer system server 12 is shown in the form of a general-purpose computing device. The components of computer system server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system server 12 typically includes a variety of computer system readable media. Such media may be any available media that is accessible by computer system server 12, and it includes both volatile and non-volatile media, removable and non-removable media.

System memory 28 can include computer system readable media in the form of volatile memory, such as random access memory (RAM) 30 and/or cache memory 32. Computer system server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system server 12 may also communicate with one or more external devices 14 such as a keyboard, a pointing device, a display 24, and the like. One or more devices that enable a user to interact with computer system server 12; and/or any devices (e.g., network card, modem, etc.) that enable computer system server 12 to communicate with one or more other computing devices. Such communication can occur via Input/Output (I/O) interfaces 22. Still yet, computer system server 12 can communicate with one or more networks such as a local area network (LAN), a general wide area network (WAN), and/or a public network (e.g., the Internet) via network adapter 20. As depicted, network adapter 20 communicates with the other components of computer system server 12 via bus 18. It should be understood that although not shown, other hardware and/or software components could be used in conjunction with computer system server 12. Examples, include, but are not limited to: microcode, device drivers, redundant processing units, external disk drive arrays, RAID systems, tape drives, and data archival storage systems, etc.

Computer system server 12 illustrated in FIG. 1 is only an example for implementing the embodiments of the present invention. The detailed embodiments may be implemented at the user's computer, at the service staff's computer, at an individual server of the online service provider, or even be implemented at a server provided by a third party.

Some approaches have been developed to record the user's interactions on the website. For example, in some modern browsers, the user's interactions with each webpage in the website may be tracked in a data log. From the data log, the user and/or other individuals can know the type of interactions as well as other information associated with the interactions performed by the user. For example, the browser can monitor the time of the interaction, the object of the interaction and other information.

In other conventional solutions, dedicated applications may be installed on the user's computer or plug-ins may be installed to the user's browser. These applications/plug-ins can detect the user's interactions with each web component in the website and collect them into a database. However, the aforementioned data associated with the user's interactions are raw data without being analyzed or processed. Moreover, such raw data is of huge amount. Even if such data can be transmitted to the service center, it will take considerable time for the service staff to figure out which interaction results in the problem occurred on the website.

In view of the above, it is desired to develop a technical solution for tracking the user's interaction trajectory associated with the problem occurred on the website automatically. According to one embodiment of the present invention, there is proposed a computer-implemented method. According to the method, an action description associated with actions performed by a user on a website is received. Then, at least one interaction matching the action description is retrieved from an interaction history of interactions between the user and the website. Next, an interaction trajectory is generated based on the retrieved at least one interaction.

Figure 2:
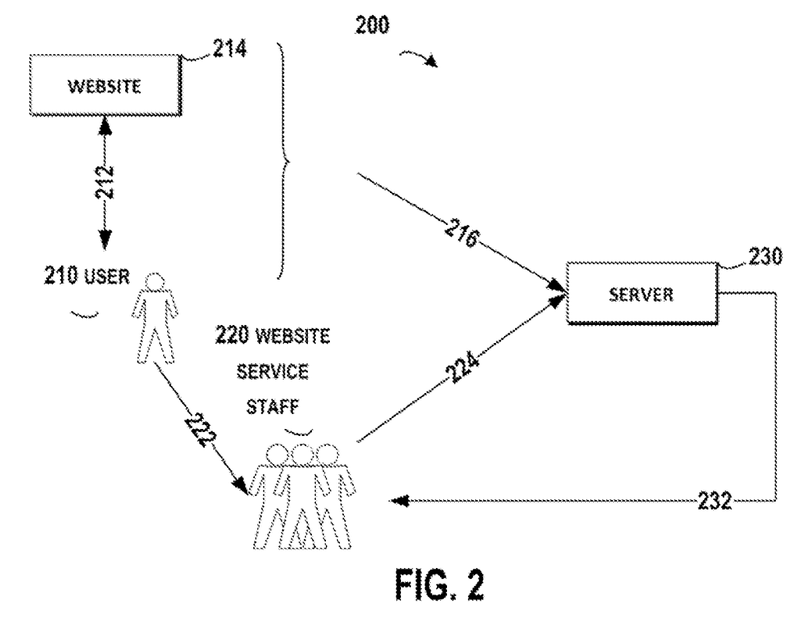
FIG. 2 schematically illustrates a block diagram of a technical solution for tracking an interaction trajectory of a user on a website, according to one embodiment of the present invention.

FIG. 2 schematically illustrates a block diagram of a technical solution for tracking an interaction trajectory of a user on a website according to one embodiment of the present invention. FIG. 2 shows interactions (as illustrated by an arrow 212) between a user 210 and a website 214, and behavior (as illustrated by an arrow 222, for example, a call) between user 210 and website service staff 220. In the context of the present invention, the technical solution for retrieving an interaction trajectory may be implemented at various locations (for example, at the user's computer, at the service staff's computer, at an individual server of the website provider, or even be implemented at a server provided by a third party). Details of the embodiment of the present invention are described with reference to FIG. 2, wherein the proposed solution is implemented by a server (for example, server 230) from a third party. With the following description, those skilled in the art can work out other embodiments of the present invention.

In FIG. 2, user 210 indicates a user browsing website 214. As illustrated by the arrow 212 in this figure, user 210 may interact with website 214, for example, click links or buttons in website 214, fill in forms in website 214 or perform other types of interactions with website 214. Collectively, these actions comprise user interactions 215. User interactions 215 may be stored into the interaction history and then user interactions 215 (i.e, the interaction history) may be transmitted to a server 230, as shown by an arrow 216. The interaction history may be stored by use of any suitable data structure. In addition, embodiments of the present invention allow defining customized data structure for the interaction history. Example embodiments of interaction history will be described in detail later.

As shown by the arrow 222, when user 210 meets a problem when interacting with website 214, he/she may call website service staff 220 and describe the problem in the call. Accordingly, an action description associated with actions performed by user 210 on website 214 may be obtained from the call, and then the action description may be transmitted to the server 230, as shown by arrow 224. Further, at least one interaction matching the action description may be retrieved from the interaction history, and then the interaction trajectory may be generated based on the retrieved at least one interaction. As shown by arrow 232, the generated interaction trajectory may be provided to website service staff 220. With the interaction trajectory, website service staff 220 may be aware of the problem on the website and find out solutions to fix the problem quickly.

Although the technical solution for retrieving an interaction trajectory as shown in FIG. 2 may adopt individual server 230 from a third party; in other embodiments, individual server 230 may be the same server for hosting the website, or individual server 230 may be the same computer used by website service staff 220 or the computer of user 210.

According to the embodiment shown in FIG. 2, interactions from the user may be collected into the interaction history. If the user's previous interactions cause a problem in his/her browser, then the call from the user to the service staff may initiate the search in the interaction history against the action description collected from the call. In this way, an interaction trajectory may be generated from the retrieved at least one interaction associated with the problem and provided to the service staff for supporting troubleshooting. For clarity, meanings of some terms as used herein are explained as below.

An interaction may refer to one interactive operation performed by the user on the website, and it may comprise relevant information from the website. For example, the user may connect to the website, input the username and email address into a form in a registration webpage, the user may click a button in the registration webpage, and meet an error message. In the context of the present invention, all of such operations may be considered as interactions. Further, it would be appreciated that the interaction may comprise not only the type of the operation but also various relevant aspects of the operation such as time of the operation, object of the operation, and so on.

An interaction history may comprise at least one interaction. The data structures for storing the interaction history may be defined and/or customized according to specific requirements or use cases. For example, an array, a list, a table or other data structures may be used for storing the interaction history. Further, the interaction history may be collected at different devices. For example, the interaction history may be collected at the user's computer by a plugin of the browser or by an individual application, or it may be collected at the server of the website provider or at other devices. Appropriate collecting methods may be selected according to demands of specific application environment, so long as the collected interaction history may support further procedures for generating the interaction trajectory.

An action description may refer to text or verbal descriptions associated with a serial of actions performed by the user on the website. For example, the action description may be the user's description of what has happened on the website during his/her access to the website. The action description may be collected from a verbal description in the call from the user, and/or a text description in a message/email from the user, for example. An example action description is shown in Table 1.

TABLE 1

Example of action description

"I connected to the website, and in the registration form, inputted the name, email then clicked on the submit button and met 404 error page."

The data structure for the action description may be defined and/or customized according to specific requirements or use cases. For example, in some embodiments, a text string may be used for saving an action description of a text type, and a voice fragment may be used for saving an action description of a voice type. Alternatively an action description of voice type may be first converted into the text type and then be saved in a text string.

An action may refer to text or verbal descriptions of an interaction from the user's viewpoint (for example, descriptive content from the user), and the action may be extracted from the action description by semantic analysis. It would be appreciated that the action provides only general information of the interaction, while the interaction is involved with detailed technical data of the website. For example, "click the submit button" may be considered as an action, while an interaction may provide much more details and may be recorded as "(type: click; object: submit button; time: 20150101-08:00:00)." It would be appreciated that the above examples of the action and the interaction are only for the purpose of illustration without suggesting any limitations. Any other suitable data structures can be used as well.

Figure 3:
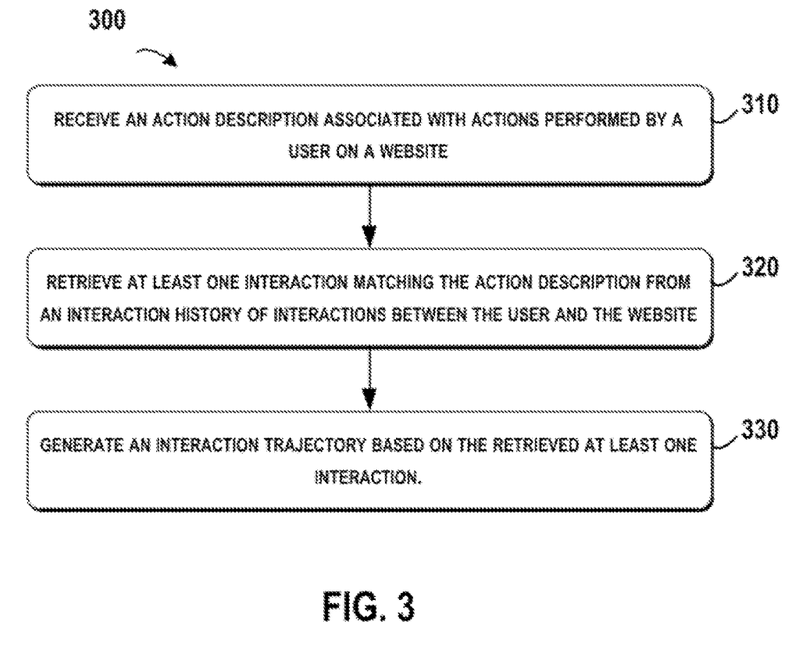
FIG. 3 schematically illustrates a flowchart of a method for tracking an interaction trajectory of a user on a website, according to one embodiment of the present invention.

Details of the embodiments of the present invention will be described with reference to a flowchart as illustrated in FIG. 3. FIG. 3 schematically illustrates a flowchart 300 of a method for tracking an interaction trajectory of a user on a website according to one embodiment of the present invention. For example, the operational steps of flowchart 300 may be performed by program modules 42.

In Step 310, an action description associated with actions performed by a user on a website is received. In the context of the embodiment, the user may visit the website and interact with various web components in the website. For example, as described above, the user may connect to the website, input the name and email then click the submit button, and meet an error; further, the user may try some other interactions.

When the user encounters a technical problem (e.g., an error message, etc.), the user may call the service staff and describe his/her previous actions that are possibly associated with the problem. For example, the user may tell the service staff in the call, "I connected to the website, completed the registration form by inputting my name and email, clicked on the submit button, and met a 404 error page." In this situation, what is said by the user may be considered as the action description, and the action description may be the same as what is shown in the above Table 1. During the contact between the user and the service staff, an action description may be received, for example, from the user's call or email. The action description may relate to portions or all of the interactions recorded in interaction history.

In Step 320, at least one interaction matching the action description is retrieved from an interaction history of interactions between the user and the website. The interaction history stores interactions between the user and the website. Continuing the above example, an example of the interaction history corresponding to the above operations may be shown in Table 2 as below.

TABLE 2

Example of interaction history

| Number | Interaction |
|---|---|
| Interaction 1 | (connect, . . . ) |
| Interaction 2 | (input & click, . . . ) |
| Interaction 3 | (meet, . . . ) |
| . . . | . . . |

It would be appreciated that details of some fields in each interaction are omitted in Table 2, and necessary information may be added into each interaction. For example, a field for describing the object of the interaction may be added, additionally, a field for describing the time of the interaction may be added. The present invention does not care about the source of the interaction history, instead, the interaction history may be obtained at the user's browser or at the website and then transmitted to the computing device for implementing the present invention.

In this step, the interaction history is searched against the action description to retrieve at least one interaction matching the action description. In the above example described with reference to Table 2, when the interaction history is checked, three continuous interactions "(connect, . . . )," "(input & click, . . . )" and "(meet, . . . )" which exactly match the action description may be retrieved.

The method then proceeds to Step 330, where an interaction trajectory is generated based on the at least one interaction retrieved in Step 320. For instance, in the above example the following interaction trajectory may be generated: (connect, . . . ) ->(input & click, . . . ) ->(meet, . . . ).

With the steps illustrated in FIG. 3, the interaction trajectory comprising at least one interaction associated with the problem occurred in the website may be generated automatically. As each interaction may comprise detailed information of various respects of the interaction, the interaction trajectory may provide exact data resulting in the problem and help the service staff in troubleshooting. Further, the generated interaction trajectory may be provided to the service staff's display for replaying the situation of the user's browser when the problem occurred. When each interaction from the interaction trajectory is replayed in front of the service staff, the service staff can clearly understand details of the situation when the problem occurred and thus effectively figure out potential causes of the problem and thereby solve the problem. Although the above trajectory comprises three interactions from the user, it would be appreciated that the trajectory may comprise only one interaction. For example, if the user cannot connect to the website, then the generated interaction trajectory may comprise only "(connect, . . . )."

In one embodiment of the present invention, retrieving at least one interaction matching the action description from the interaction history may be performed in the following way. First, the action description is interpreted into an action sequence comprising at least one chronologically ordered action. Then with regard to each action comprised in the action sequence, the interaction history may be searched for an interaction corresponding to the action. Each action comprised in the action sequence may be processed one by one. In other words, initially, the first action may be taken as the current action and an interaction corresponding to the first action may be found; and then the second action may be taken as the current action and an interaction corresponding to the second action may be found. Still in reference to the above example, the action description illustrated in Table 1 may be interpreted into the action sequence illustrated in Table 3 as below, wherein three actions are comprised in the action sequence.

TABLE 3

Example of action sequence

| Number | Action |
|---|---|
| Action 1 | I connect to the website |
| Action 2 | I completed the registration form by inputting my name and email, clicked on the submit button |
| Action 3 | And met a 404 error page |

During the access to the website, one or more chronologically ordered actions may be performed by the user, and after that, an error may occur. The user can then call the service center and explain what has happened to the service staff. As the action description may comprise a sequence of action chronologically performed by the user, the action description may be interpreted into an action sequence by an appropriate analysis algorithm.

In one embodiment of the present invention, the action description is in natural language, and during interpreting the action description into the action sequence, each clause in the action description is converted into a corresponding action by semantic analysis. Taking the action description in Table 1 as an example, the action description is in natural language and is a verbal description from the call. Usually, the action description comprise several clauses connected with conjunctions such as "and," "then" and "after." Accordingly, the action description may be divided into several clauses and then each clause may be mapped into a corresponding action.

A correspondence relationship between an action and an interaction may be defined in advance. Further, it would be appreciated that the user may perform a plurality of interactions on different webpages of the website at different times. As a result, there may be a one-to-multiple correspondence relationship between the actions and the interactions. For example, after the error message is displayed, the user may try to connect to the website again and repeat the above interactions for several times, in this respect the action "I connect to the website" may correspond to a plurality of interactions.

Further, sometimes the wording in the verbal description may be inaccurate. For example, there may be some hypernym/hyponyms in the action description. When the user visits an online store and buys a cell phone, he/she may alternatively use the terms "phone," "cell phone," and "mobile phone" to indicate a cell phone. Although the terms are different, all these terms refer to a cell phone. In addition, the user may use different verbs to describe his/her action. For example, some synonyms may appear in the action description. Considering the action of "clicking a button," the user may express it differently, for example, "click a button," "select a button," "choose a button," "go to a button" and so on.

In view of the above, semantic analysis may be adopted in interpreting the action description into the action sequence. Specifically, each clause in the action description may be converted into a corresponding action by semantic analysis. It would be appreciated that the above paragraphs illustrate example situations of hypernym, hyponym, and synonyms, a term list for storing alternative terms may be defined in respect of hyponym and/or synonyms. The above examples of semantic analysis are described only for the purpose of illustration and help to understand and implement the present invention, without suggesting any limitation as to the scope of the invention. The above paragraphs are not intended to limit the semantic analysis algorithm in the embodiments of the present invention. Appropriate algorithms may be adopted according to demands of specific application environment, so long as each clause in the action description is converted into a corresponding action.

It would be appreciated that the website is usually organized in a hierarchical structure. The knowledge about such hierarchy of the website may facilitate finding out each potential interaction between the user and the website. In some embodiments, the interaction history may be obtained by use of an interaction graph. For example, in one embodiment, an interaction graph of the website may be built based on a logical structure of the website. In the interaction graph, a node indicates a web component in the website, and an edge indicates a potential interaction between the user and the website. Then, it is possible to mark on the interaction graph based on the interactions between the user and the website to generate the interaction history.

Figure 4:
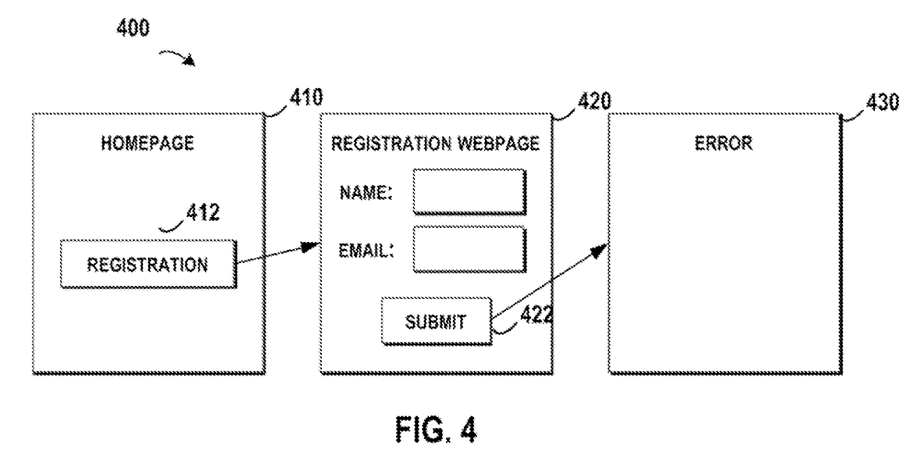
FIG. 4 schematically illustrates examples of web components of a website, according to one embodiment of the present invention.

Reference is made to FIG. 4 which shows a hierarchical structure of a website, in which examples of hierarchical levels of a website, according to one embodiment of the present invention are schematically illustrated. In the example shown in FIG. 4, there are three webpages 410, 420, and 430 in different hierarchical levels. In this example, webpage 410 is a homepage of the website shown in the browser when the user connects to the website. Registration webpage 420 is a registration form shown in the browser when the user clicks the registration button 412 in webpage 410 (i.e. the homepage). After the user inputs his/her username and email address and clicks submit button 422, an error message (located on error webpage 430) is prompted. In this example, there are two links: (1) when the user clicks registration button 412, the page may be linked to registration webpage 420; and (2) when the user clicks submit button 422, the page may be linked to error webpage 430.

Figure 5:
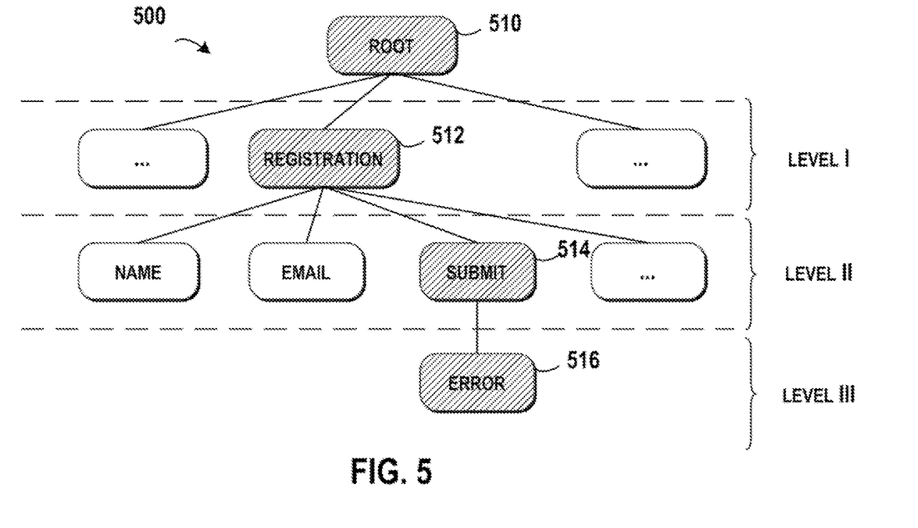
FIG. 5 schematically illustrates a logical structure graph of the website according to one embodiment of the present invention.

FIG. 5 shows a logical structure graph 500 of the website, according to one embodiment of the present invention. As shown, the shaded portions of the logical structure graph represents an interaction graph of the interactions between the user and the website built on the basis of the logical structure graph.

Root 510 in FIG. 5 indicates a root node of the logical structure of the website. As shown in this figure, level 1 may indicate the first level of the logical structure of the website, wherein registration 512 and other nodes (represented by the ellipses " . . . " in this figure) in this level may correspond to the web components in the homepage of the website. With reference to FIGS. 4 and 5, node "registration 512" in FIG. 5 may correspond to the button "registration 412" in FIG. 4. In FIG. 5, level II may indicate the second level of the website, wherein submit 514 and other nodes in this level may correspond to the web components in the registration webpage of the website. Specifically, the nodes of name and email in FIG. 5 may correspond to the text field of "name" and "email" in FIG. 4 respectively. Further, level III may indicate the third level of the website and error 516 in FIG. 5 may represent an error webpage (corresponding to the webpage "error 430" in FIG. 4) prompted to the user.

With the knowledge of the logical structure graph of the website, an interaction graph of interactions between the user and the website may be constructed as the user interacts with the website. In the context of the present invention, the interaction graph may be similar as the logical structure graph of the website, wherein the node in the interaction graph indicates a web component in the website, and the edge between connected nodes indicates a potential interaction between the user and the website.

It would be appreciated that levels of granularity of the interaction can be defined according to specific requirements or use cases. For example, the operation for inputting username into the "name" field may be an interaction. As another example, inputting username and email address and then clicking submit button may constitute an interaction. Since inputting username and email address usually causes no exception, the operations of inputting and clicking may be integrally considered as one interaction. On the other hand, if the website checks formats of the inputted data (i.e., an email address should contain the character "@," otherwise an error message may be prompted), then inputting the username, inputting the email address, and clicking the submit button may be considered as three individual interactions.

Initially, the interaction graph may be built to contain all potential interactions between the user and the website. Then relevant nodes in the interaction graph may be marked based on the interactions between the user and the website. In other words, irrelevant nodes may be pruned from the graph so as to generate the interaction history for the user. Continuing the above example, when the user's interactions comprise connecting, inputting and clicking, the interaction procedure shown in FIG. 4 may involve three web components, namely, the registration 512, submit 514 and error 516 in FIG. 5. After the pruning, a sub-graph comprising shaded nodes 510, 512, 514 and 516 may be obtained, wherein the edge between two connected nodes may indicate an interaction. For example, the edge between root 510 and registration 512 may indicate "(connect, . . . )" shown in Table 2, the edge between registration 512 and submit 514 may indicate "(input & click, . . . )" shown in Table 2, and the edge between submit 514 and error 516 may indicate "(meet, . . . )" shown in Table 2. For another example, if the user performs the interaction procedure in FIG. 4 for several times, then the interaction graph may comprise several sub-graph including nodes 512, 514 and 516 of FIG. 5.

The above paragraphs describe how to build a logical structure graph of the website with reference to FIGS. 4 and 5, wherein FIG. 4 illustrates a simple website having only two links in the website, and the logical structure graph of the website of FIG. 4 may be described with a tree structure as shown in FIG. 5. In a complex website, there may be multiple webpages and hundreds of links among these webpages, and thus the complex website may be illustrated by a directed graph and edges in the graph may indicate links between webpages. Based on the principle described with reference to FIGS. 4 and 5, those skilled in the art can establish a logical structure graph of the complex website and obtain the interaction history by a similar pruning step.

It would be appreciated that the data structures in the above example are exemplary and other ways for defining data may be used in implementing the idea of the present invention. Hereinafter, details of additional features of the present invention will be described. In the embodiments of the present invention, customized data structure may be defined for the interaction, and reference is made to FIGS. 6A and 6B to introduce details of the data structure.

Figure 6A:
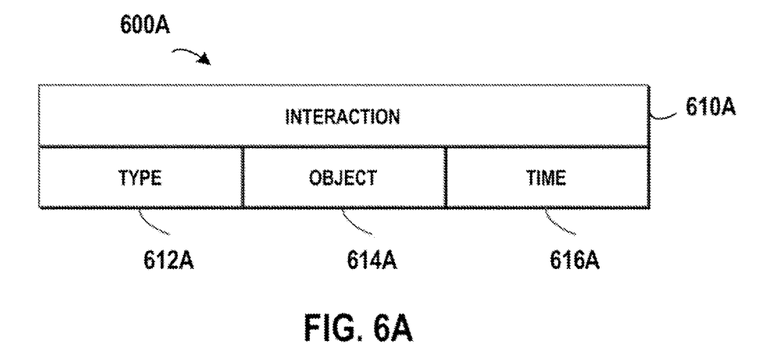
FIG. 6A schematically illustrates a data structure for defining an interaction in the interaction history, according to one embodiment of the present invention.

FIG. 6A schematically illustrates a data structure for describing an interaction in the interaction history according to one embodiment of the present invention. As illustrated in FIG. 6A, the interaction may comprise three fields, i.e., type 612A, object 614A and time 616A. Type 612A may represent the type of the interaction, for example, the type may be "connect," "input & click," or "meet." Object 614A may represent a web component to which the interaction relates. For example, in the context of the above interaction procedure, the object may be the submit button in the registration webpage when the type is "input & click." Further, time may be a timestamp of the interaction. According to embodiments of the present invention, one triple may be used to represent each interaction. For example, the interactions related to FIGS. 4 and 5 may be defined as below:

TABLE 4

Example of interaction history

| Number | Interaction |
|---|---|
| Interaction 1 | (connect, the website, 20150101-08:00:00) |
| Interaction 2 | (input & click, submit button, 20150101-08:02:00) |
| Interaction 3 | (meet, 404 error page, 20150101-08:03:00) |

Table 4 shows an example of the interaction history. Interaction 1 indicates that the user connected to the website at Jan. 1, 2015, 08:00:00 AM, then inputted data and clicked the submit button at 08:02:00 AM, next the user met a 404 error page at 08:03:00 AM.

FIG. 6A schematically illustrates a simplified data structure 600A that may be used in one embodiment of the present invention. In some situations, when a plurality of users access the website and meet problems, these users may call the service center for help. At this time, the service staff needs to identify each user and then trace the corresponding interaction trajectory. In other situations, detailed information of the website may be recorded so as to facilitate retrieving the interactions matching the action description.

Figure 6B:
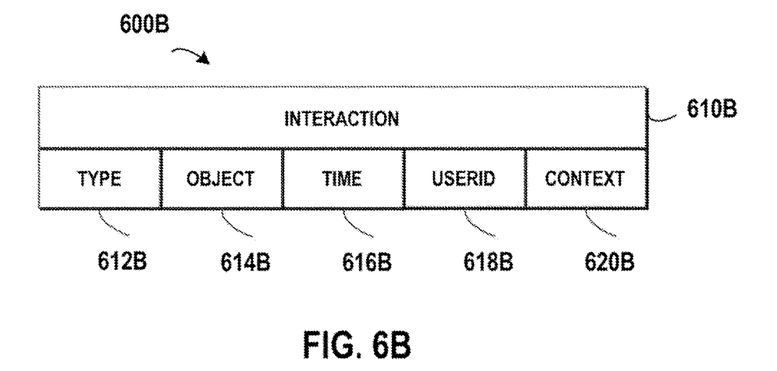
FIG. 6B schematically illustrates another data structure for defining an interaction in the interaction history, according to another embodiment of the present invention.

Accordingly, any information of interest may be added into the data structure. For example, FIG. 6B schematically illustrates another data structure 610B for describing an interaction in the interaction history according to another embodiment of the present invention. Fields 612B, 614B and 616B in FIG. 6B correspond to fields 612A, 614A and 616A in FIG. 6A respectively, further there are two additional fields in FIG. 6B. Specifically, UserID 618B indicates the identification of the user, and context 620B indicates the environment and background of the interaction, for example, context 620B may comprise description of the webpage in which the interaction is performed, text displayed in the webpage, and other information associated with the interaction.

As the website may serve millions of users at the same time, it is necessary to record each user's identification information so as to distinguish each user's interactions on the website. Accordingly, UserID 618B may be added into the definition of the interaction for providing customized service to each individual user. Further, during the user's access to the website, the user may perform actions of the same type for several times, and the environment during each action may vary significantly. For example, when the user clicks different buttons, the text and other content display in the webpage may be different, the layout of the webpage may change. In this regard, the context field is added into the interaction to provide accurate environment information of the interaction. Based on the example of triples as shown in Table 4, a five-tuple may be used to represent each interaction as: (connect, the website, 20150101-08:00:00, User001, "Welcome to * store. BLACK, Font size 4, . . . "). The five-tuple indicates: when User001 connected to the website on Jan. 1, 2015 at 08:00:00 AM, "Welcome to * store" was displayed on the website with font size 4 in black.

In one embodiment of the present invention, if an action type of the interaction in the interaction history is corresponding to the action, then the interaction may be determined to be corresponding to the action. As illustrated in FIGS. 6A and 6B, the interaction may comprise a "type" field, and this type may be compared with the action extracted from the user's action description. If the action type in the interaction corresponds to the action, the interaction is determined to be corresponding to the action. Referring back to the actions in Table 3 and the interactions in Table 4, as Action 1 in Table 3 and Interaction 1 in table 4 both relate to a "connect" type, it is determined that interaction 1 in Table 4 is an interaction corresponding to action 1 in Table 3.

It would be appreciated that the user may perform a number of interactions of different types on the website. As a result, in some cases, only the comparison of type may not be enough for confirming the correspondence relationship between the action and the interaction. In order to further verify the correspondence, the timestamps of the retrieved at least one interaction may be checked. In other words, the chronological order may be taken into account to verify whether the time order between the retrieved at least one interaction matches the time order between the one or more chronologically ordered actions extracted from the action description.

In one embodiment of the present invention, in response to a timestamp of the interaction in the interaction history being later than a timestamp of a previous interaction corresponding to a previous action of the current action, the interaction may be determined to be corresponding to the current action.

In the context of the present invention, the at least one action in the action sequence are chronologically ordered, and the first action is the earliest action in the action sequence. The actions in the action sequence may be processed one by one in a chronological order. The first action in the action sequence is processed first and at this time the first action is the current action. Since the first action is the earliest action, the interaction corresponding to the first action may be directly determined without considering the timestamp of the interaction. Next, the timestamp of the interaction is obtained and then the second action is processed.

At this point, the second action is the current action and the first action is the previous action. With respect to the second action, a second interaction whose type corresponds to the second action may be in retrieved in the interaction history. Then the timestamp of the second interaction is checked to obtain the time order between the timestamps of the first and second interactions. If the timestamp of the second interaction is later than that of the first interaction, then the second interaction is an interaction occurred later than the first interaction thereby the time order between the first and second interactions is consistent with that between the first and second actions. In this regard, the second action in the action sequence is processed and then the third action in the action sequence becomes the current action and the above step may be repeated for the third and other subsequent actions.

It would be appreciated that the above paragraphs schematically describe a situation where only one interaction corresponding to the current action is retrieved in the interaction history. In another situation, with regard to the current action in the action sequence, at least one interaction whose type corresponds to the current action may be retrieved in the interaction history, and then the timestamp of each of the retrieved at least one interaction may be checked. Specifically, if more than one interaction corresponding to the current action is retrieved, then more than one candidate list comprising possible combination of the interactions may be generated and then the above steps may be repeated for each candidate list. In other words, the above step of comparing the timestamps may be performed to the interactions in each candidate list. In another situation, if the length of the interaction history is shorter than that of the action sequence, the method may go to the end and return "FALSE."

Figure 7:
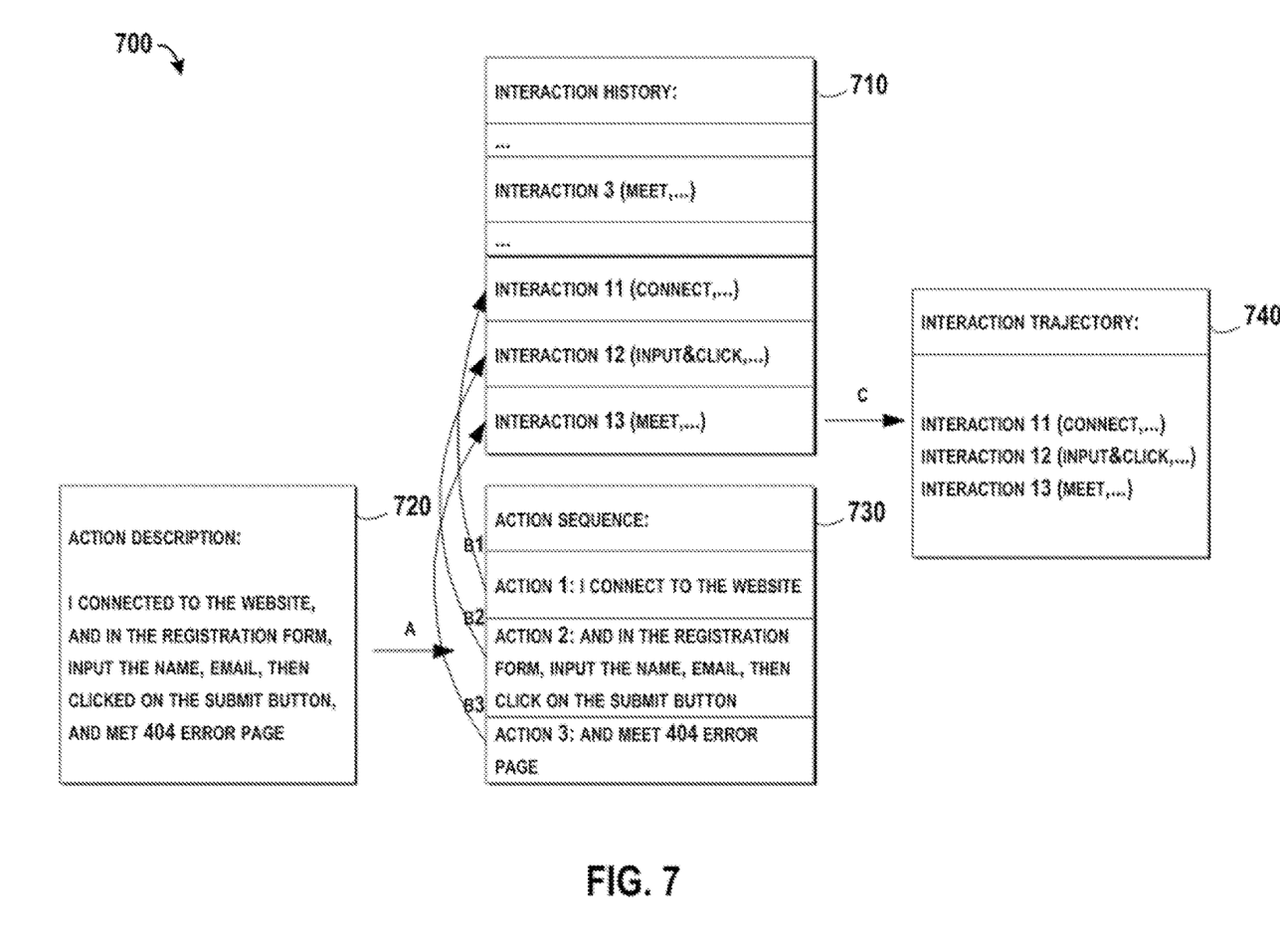
FIG. 7 schematically illustrates a detailed block diagram of a technical solution for tracking an interaction trajectory of a user on a website, according to one embodiment of the present invention.

FIG. 7 schematically illustrates a detailed block diagram 700 of a technical solution for tracking an interaction trajectory of a user on a website according to one embodiment of the present invention. The interactions between the user and the website in the user's browser are collected at the user's browser and then saved into an interaction history 710 in a chronologically order. For simplicity, only the type of the interaction is illustrated in this figure, and other fields are omitted. An action description 720 is collected from the call between the user and the website service staff. The action description 720 describes a serial of actions taken by the user before the occurrence of the problem (the 404 error webpage). Actions 1, 2 and 3 in an action sequence 730 are actions extracted from the action description 720 (as shown by arrow A). By comparing the type of each interaction in the interaction history 710 and each action in the action sequence 730, it is determined that the action 1 corresponds to the interaction 11, the action 2 corresponds to the interaction 12, and the action 3 corresponds to the interaction 3 and the interaction 13. Next, two candidate interaction lists (not shown in FIG. 7) may be generated:

List 1: (interaction 11, interaction 12, interaction 3).
List 2: (interaction 11, interaction 12, interaction 13).

With respect to each of List 1 and List 2, the timestamps of interactions in each list are checked to determine whether these timestamps are chronologically ordered. As the timestamp of the interaction 3 in List 1 is earlier than the timestamp of the previous interaction 12, the time order of the interactions in List 1 is not consistent with that of the actions in action sequence 730. Therefore List 1 is discarded. A similar process may be performed to List 2. Because both the type and the timestamp of the interactions in List 2 are qualified, List 2 is qualified. Specifically, the action 1 corresponds to interaction 11 (as shown by arrow B1), the action 2 corresponds to interaction 12 (as shown by arrow B2), and the action 3 corresponds to interaction 13 (as shown by arrow B3). Further, an interaction trajectory 740 may be generated from the interactions 11 to 13.

In one embodiment of the present invention, in response to determining a chronological order of timestamps of the retrieved at least one interaction being matched with a chronological order of actions in the action sequence, the interaction trajectory may be generated from the at least one interaction according to the chronological order of timestamps of the at least one interaction.

With the above technical solution, by considering the type and timestamp of the interaction, the at least one interaction retrieved in the interaction history are chronologically ordered interactions and each interaction in the interaction history corresponds to an action extracted from the user's action description. The interaction trajectory may be generated according to the retrieved at least one interaction. With the generated interaction trajectory, the website service staff may quickly understand the situation when the problem happened at the user's browser during his/her access to the website and then solve the problem efficiently. Continuing the example illustrated in FIG. 7, interaction trajectory 740 is generated based on the retrieved interactions 11, 12 and 13, i.e., the interaction trajectory may be: (connect, . . . ) ->(input & click, . . . ) ->(meet, . . . ).

In one embodiment of the present invention, the interaction trajectory may be generated in response to determining the at least one interaction being continuous interactions in the interaction trajectory.

Usually, the actions extracted from the user's action description are continuous actions performed by the user. It is desired to find continuous interactions in the interaction trajectory. Table 5 illustrates an example of interaction history, wherein interactions 1-6 are included in the interaction history.

TABLE 5

| Example of interaction history | |
|---|---|
| Number | Interaction |
| Interaction 1 | (connect, registration button, 20150101-08:00:00) |
| Interaction 2 | (meet, 404 error page, 20150101-08:03:00) |
| . . . | . . . |
| Interaction 4 | (connect, registration button, 20150101-09:00:00) |
| Interaction 5 | (input & click, submit button, 20150101-09:02:00) |
| Interaction 6 | (meet, 404 error page, 20150101-09:03:00) |

According to the above technical solution, based on the action description in Table 1, the following List 3 and List 4 may be retrieved from the interaction history of Table 5:

List 3: (interaction 1, interaction 5, interaction 6)
List 4: (interaction 4, interaction 5, interaction 6)

Although the timestamps of interactions 1, 5, and 6 in List 3 meet the above time order, these interactions (i.e., 1, 5, and 6) are not continuous and thus may be discarded. List 4 is qualified because interactions 4-6 are continuous interactions.

Sometimes, the user cannot accurately describe each and every action before the occurrence of the problem. For example, the user may miss one or more actions in the call, in which case the actions in the action description are not continuous. In this event, both of Lists 3 and 4 are potential qualified lists and may be prompted to the service staff for further manual judgment.

In one embodiment of the present invention, the at least one interaction matching the action description comprises may be retrieved in the interaction history by creating an index for the interaction history via a full text search algorithm. Then, the interaction history is searched for the at least one interaction based on the index.

In the context of the present invention, the interaction may comprise various fields and the interaction may be of large amount of data. In order to increase the searching efficiency, each interaction may be treated as a document and each field in the interaction may be considered as metadata of the document. Index may be built for the interactions in the interaction history to reduce the searching cost, for example, a full text indexer may be adopted in building the index. The index may be built by commercial indexing solution or other indexing solutions, and details of the indexing solution may are omitted here.

In one embodiment of the present invention, the at least one interaction included in the interaction trajectory may be replayed in context of the website. In some embodiments, user's interactions associated with his/her action description may be tracked. As the action description is the user's text input or verbal description about the problem occurred on the website, the interaction trajectory associated with the problem may be retrieved.

In this way, embodiments of the present invention allow the website service staff to understand information related to the problem. By replaying, in context of the website at the website service staff's browser, the at least one interaction included in the interaction trajectory, the service staff may be aware of the user's interactions with the website in the browser as well as what happened in the browser in a more efficient and effective way. Assisted by the interaction trajectory, the service staff may find out solutions to fix the problem quickly.

Various embodiments implementing the method of the present invention have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus/system based on the same invention concept. Even if the apparatus/system has the same hardware structure as a general-purpose processing device, the functionality of software contained therein makes the apparatus/system manifest distinguishing properties from the general-purpose processing device, thereby forming an apparatus/system of the various embodiments of the present invention. The apparatus/system described in the present invention comprises several means or modules, the means or modules configured to execute corresponding steps. Upon reading this specification, those skilled in the art may understand how to write a program for implementing actions performed by these means or modules. Since the apparatus/system is based on the same invention concept as the method, the same or corresponding implementation details are also applicable to means or modules corresponding to the method. As detailed and complete description has been presented above, the apparatus/system is not detailed below.

According to one embodiment of the present invention, a computing system is proposed. The computing system comprises a computer processor coupled to a computer-readable memory unit, the memory unit comprising instructions that when executed by the computer processor implements a method. In the method, an action description associated with actions performed by a user on a website is received. Then, at least one interaction matching the action description is retrieved from an interaction history of interactions between the user and the website. Next, an interaction trajectory is generated based on the retrieved at least one interaction.

In one embodiment of the present invention, retrieving the at least one interaction matching the action description from the interaction history may be implemented by the following steps. First, the action description is interpreted into an action sequence comprising at least one chronologically ordered action; then with regard to a current action comprised in the action sequence, an interaction corresponding to the current action is found in the interaction history.

In one embodiment of the present invention, the action description is in natural language, and during interpreting the action description into the action sequence, each clause in the action description is converted into a corresponding action by semantic analysis.

In one embodiment of the present invention, during finding in the interaction history the interaction corresponding to the current action, in response to an action type of the interaction in the interaction history being corresponding to that of the current action, the interaction is determined to be corresponding to the current action.

In one embodiment of the present invention, during determining the interaction to be corresponding to the current action, in response to a timestamp of the interaction in the interaction history being later than a timestamp of a previous interaction corresponding to a previous action of the current action, the interaction is determined to be corresponding to the current action.

In one embodiment of the present invention, during generating the interaction trajectory based on the retrieved at least one interaction, in response to determining a chronological order of timestamps of the at least one interaction being matched with a chronological order of actions in the action sequence, the interaction trajectory is generated from the at least one interaction according to the chronological order of timestamps of the at least one interaction.

In one embodiment of the present invention, an interaction graph of the website is built based on a logical structure of the website. In this embodiment, a node in the interaction graph indicates a web component in the website, and an edge in the interaction graph indicates a potential interaction between the user and the website. Further, the interaction graph is marked based on the interactions between the user and the website to generate the interaction history.

In one embodiment of the present invention, retrieving the at least one interaction matching the action description from the interaction history may be implemented by the following steps. First, an index for the interaction history may be created via a full text search algorithm. Second, the at least one interaction is found from interaction history based on the index.

In one embodiment of the present invention, the at least one interaction included in the interaction trajectory is replayed in context of the website.

According to one embodiment of the present invention, a computer program product is proposed. The computer program product is tangibly stored on a non-transient machine-readable medium and comprising machine-executable instructions. The instructions, when executed on an electronic device, cause the electronic device to: receive an action description associated with actions performed by a user on a website; retrieve at least one interaction matching the action description from an interaction history of interactions between the user and the website; and generate an interaction trajectory based on the retrieved at least one interaction.

In one embodiment of the present invention, the instructions further causing the electronic device to: interpret the action description into an action sequence comprising one or more chronologically ordered actions; and with regard to a current action comprised in the action sequence, find in the interaction history an interaction corresponding to the current action.

In one embodiment of the present invention, the action description is in natural language, and the instructions further causing the electronic device to: convert each clause in the action description into a corresponding action by semantic analysis.

In one embodiment of the present invention, the instructions further causing the electronic device to: in response to an action type of the interaction in the interaction history being corresponding to that of the current action, determine the interaction to be corresponding to the current action.

In one embodiment of the present invention, the instructions further causing the electronic device to: in response to a timestamp of the interaction in the interaction history being later than a timestamp of a previous interaction corresponding to a previous action of the current action, determine the interaction to be corresponding to the current action.

In one embodiment of the present invention, the instructions further causing the electronic device to: in response to determining a chronological order of timestamps of the at least one interaction being matched with a chronological order of actions in the action sequence, generate the interaction trajectory from the at least one interaction according to the chronological order of timestamps of the at least one interaction.

In one embodiment of the present invention, the instructions further causing the electronic device to: build an interaction graph of the website based on a logical structure of the website, wherein a node in the interaction graph indicates a web component in the website, and an edge in the interaction graph indicates a potential interaction between the user and the website; and mark on the interaction graph based on the interactions between the user and the website to generate the interaction history.

In one embodiment of the present invention, the instructions further causing the electronic device to: create an index for the interaction history via a full text search algorithm; and search the interaction history for the at least one interaction based on the index.

In one embodiment of the present invention, the instructions further causing the electronic device to: replay, in context of the web site, the at least one interaction included in the interaction trajectory.

Moreover, the system may be implemented by various manners, including software, hardware, firmware or a random combination thereof. For example, in some embodiments, the apparatus may be implemented by software and/or firmware. Alternatively or additionally, the system may be implemented partially or completely based on hardware. for example, one or more units in the system may be implemented as an integrated circuit (IC) chip, an application-specific integrated circuit (ASIC), a system on chip (SOC), a field programmable gate array (FPGA), etc. The scope of the present intention is not limited to this aspect.

The present invention may be a system, an apparatus, a device, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by one or more computer processors, a natural language action description associated with actions performed by a user on a website;
   building, by the one or more computer processors, an interaction graph of the website based on a logical structure of the website, wherein a node in the interaction graph indicates a web component in the website, and an edge in the interaction graph indicates a potential interaction between the user and the website;
   marking, by the one or more computer processors, the interaction graph based on the interactions between the user and the website to generate an interaction history;
   retrieving, by one or more computer processors, at least one user interaction matching the action description from the interaction history of user interactions between the user and the website by interpreting and converting using semantic analysis by the one or more computer processors each text or verbal clause in the action description into a corresponding action in an action sequence comprising at least one chronologically ordered action;
   finding by one or more computer processors in the interaction history, with regard to an action in the action sequence, a user interaction corresponding to the action by determining whether an action type of the interaction corresponds to an action type of the action;
   generating, by one or more computer processors, an interaction trajectory associated with a problem that occurred on the website and a technical solution for the problem that occurred on the website, based, at least in part, on the retrieved at least one user interaction; and
   implementing the technical solution associated with the action trajectory.

2. The method of claim 1, wherein determining that the user interaction corresponds to the action further comprises:
   in response to a timestamp of the user interaction in the interaction history being later than a timestamp of a previous user interaction corresponding to a previous action of the action, determining, by one or more computer processors, the user interaction to be corresponding to the action.

3. The method of claim 2, wherein generating the interaction trajectory based on the retrieved at least one user interaction comprises:
   in response to determining a chronological order of timestamps of the at least one user interaction being matched with a chronological order of actions in the action sequence, generating, by one or more computer processors, the interaction trajectory from the at least one user interaction according to the chronological order of timestamps of the at least one user interaction.

4. The method of claim 1, wherein retrieving the at least one interaction matching the action description from the interaction history comprises:
   creating, by one or more computer processors, an index for the interaction history via a full text search algorithm; and
   searching, by one or more computer processors, the interaction history for the at least one interaction based on the index.

5. The method of claim 1, further comprising:
   replaying, by one or more computer processors, in context of the website, the at least one interaction included in the interaction trajectory.

6. A computing system comprising:
one or more computer processors;
one or more computer readable storage media; and
program instructions stored on the one or more computer readable storage media for execution by at least one of the one or more computer processors, the program instructions comprising:
program instructions to receive a natural language action description associated with actions performed by a user on a website;
program instructions to build, by the one or more computer processors, an interaction graph of the website based on a logical structure of the website, wherein a node in the interaction graph indicates a web component in the website, and an edge in the interaction graph indicates a potential interaction between the user and the website;
program instructions to mark, by the one or more computer processors, the interaction graph based on the interactions between the user and the website to generate an interaction history;
program instructions to retrieve at least one user interaction matching the action description from an interaction history of user interactions between the user and the website by interpreting and converting using semantic analysis by the one or more computer processors each text or verbal clause in the action description into a corresponding action in an action sequence comprising at least one chronologically ordered action;
program instructions to find by one or more computer processors in the interaction history, with regard to a action in the action sequence, a user interaction corresponding to the action by determining whether an action type of the interaction corresponds to an action type of the action;
program instructions to generate an interaction trajectory associated with a problem that occurred on the website and a technical solution for the problem that occurred on the website, based on the retrieved at least one interaction; and
program instructions to implement the technical solution associated with the action trajectory.

7. The system of claim 6, wherein the program instructions to determine that the interaction corresponds to the action further comprise:
program instructions to, in response to a timestamp of the user interaction in the interaction history being later than a timestamp of a previous user interaction corresponding to a previous action of the action, determine the user interaction to be corresponding to the action.

8. The system of claim 7, wherein the program instructions to generate the interaction trajectory based on the retrieved at least one user interaction comprise:
program instructions to, in response to determining a chronological order of timestamps of the at least one user interaction being matched with a chronological order of actions in the action sequence, generate the interaction trajectory from the at least one interaction according to the chronological order of timestamps of the at least one user interaction.

9. A computer program product comprising: one or more computer readable storage media and program instructions stored on the one or more computer readable storage media, the program instructions comprising:
program instructions to receive a natural language action description associated with actions performed by a user on a website;
program instructions to build, by the one or more computer processors, an interaction graph of the website based on a logical structure of the website, wherein a node in the interaction graph indicates a web component in the website, and an edge in the interaction graph indicates a potential interaction between the user and the website;
program instructions to mark, by the one or more computer processors, the interaction graph based on the interactions between the user and the website to generate an interaction history;
program instructions to retrieve at least one user interaction matching the action description from an interaction history of user interactions between the user and the website by interpreting and converting using semantic analysis, by the one or more computer processors, each text or verbal clause in the action description into a corresponding action in an action sequence comprising at least one chronologically ordered action;
program instructions to find by one or more computer processors in the interaction history, with regard to an action in the action sequence, a user interaction corresponding to the action by determining whether an action type of the interaction corresponds to an action type of the action;
program instructions to generate an interaction trajectory associated with a problem that occurred on the website and a technical solution for the problem that occurred on the website, based on the retrieved at least one interaction; and
program instructions to implement the technical solution associated with the action trajectory.

* * * * *